United States Patent [19]

van der Molen

[11] Patent Number: 4,832,897
[45] Date of Patent: May 23, 1989

[54] PROCESS FOR THE PREPARATION OF BLOWN FILM

[75] Inventor: Theodorus J. van der Molen, Vijlen, Netherlands

[73] Assignee: Stamicarbon B.V., Geleen, Netherlands

[21] Appl. No.: 865,393

[22] Filed: May 21, 1986

Related U.S. Application Data

[63] Continuation-in-part of Ser. No. 696,497, Jan. 30, 1985, abandoned, and a continuation-in-part of Ser. No. 842,147, Mar. 21, 1986, abandoned, which is a continuation of Ser. No. 696,498, Jan. 30, 1985, abandoned.

[30] Foreign Application Priority Data

Feb. 7, 1984 [NL] Netherlands .................. 8400374
Feb. 7, 1984 [NL] Netherlands .................. 8400375

[51] Int. Cl.⁴ .................. B29C 47/20; B29C 47/86
[52] U.S. Cl. .................. 264/564; 264/176.1; 425/72.1; 526/352.2
[58] Field of Search .................. 264/564, 563, 565–569, 264/173, 519, 176.1; 425/326.1, 71, 72 R, 380, 467, 72.1; 526/352.2

[56] References Cited

U.S. PATENT DOCUMENTS

| | | | |
|---|---|---|---|
| 2,461,975 | 2/1949 | Fuller | 264/569 |
| 3,243,486 | 3/1966 | Pilaro | 425/326.1 |
| 3,311,682 | 3/1967 | Ringley et al. | 425/71 |
| 3,754,067 | 8/1973 | St. Eve et al. | 264/237 |
| 3,920,782 | 11/1975 | Cogswell | 264/148 |
| 4,243,619 | 1/1981 | Fraser et al. | 264/40.6 |
| 4,282,177 | 8/1981 | Kurtz et al. | 264/564 |
| 4,348,349 | 9/1982 | Kurtz | 526/124 |
| 4,360,494 | 11/1982 | Kurtz | 264/564 |
| 4,388,262 | 6/1983 | Brasz et al. | 264/349 |
| 4,399,094 | 8/1983 | Fujitani et al. | 264/569 |
| 4,505,657 | 3/1985 | Ikeya | 425/72 R |
| 4,511,530 | 4/1985 | Olsson et al. | 264/564 |
| 4,632,801 | 12/1986 | Dowd | 264/569 |

FOREIGN PATENT DOCUMENTS

0036757 9/1981 European Pat. Off. .
897518 5/1962 United Kingdom .............. 264/519

*Primary Examiner*—Jeffery Thurlow
*Attorney, Agent, or Firm*—Cushman, Darby & Cushman

[57] ABSTRACT

A process for the preparation of highly oriented blown polyethylene film is disclosed. The film is mono-axially oriented and has improved stiffness, tear resistance and tensile strength. In the process, a molten polymer composition is extruded through an annular die gap of at least 2 mm at a melt temperature at the die gap of below 160° C. The process achieves films which exhibit an x-ray diffraction intensity ratio max/min of the 110 retleation band of at least 20 and an angle α between the average orientation direction of the polymer molecules and film extrusion direction of at most 20°.

6 Claims, 6 Drawing Sheets

PROCESS FOR THE PREPARATION OF BLOWN FILM

This is a continuation-in-part of Ser. No. 696,497, filed Jan. 30, 1985 and Ser. No. 842,147, filed Mar. 21, 1986 both of which are now abandoned. Ser. No. 842,147 is a continuation of Ser. No. 696,498, filed Jan. 30, 1985 now abandoned.

The invention relates to a process for the preparation of blown film from a polymer composition on the basis of polyethylene, which polyethylene has a density of 910 to 940 kg/m$^3$, in which the polymer composition is, in molten condition, forced via an extruder through an annular die having a width of at least 2 mm and is made to balloon out by means of a gas, supplied through an opening within the annular die, following which the polymer composition that has formed the balloon is cooled, flattened and rolled up.

Such a process for the preparation of blown film is well-known in itself and is described in, for instance, 'Petrothene Polyolefins... a processing guide' (a publication of the National Distillers and Chemical Corporation, 1971, 4th ed.).

Low-density polyethylene (LDPE) blown film has found large-scale application as packaging material. The main requirements to be met by packaging material concern mechanical properties, such as stiffness, tear resistance, tensile strength, puncture resistance, and the like.

Depending on the application, said material must often also satisfy requirements in the field of optical properties such as transparency, opacity and gloss.

Film to be processed into refuse bags, for instance, will need to have a good puncture resistance and tear properties, while the film for carrier bags must in addition have high stiffness. In application such as break packaging, it is especially stiffness and opticals that play a part.

From 'Petrothene Polyolefins... a processing guide' it is known that the best optical properties are obtained when the polymer melt is processed as the highest possible temperatures. A melt temperature of 205° C. is not exceptional.

One of the factors affecting the mechanical properties is the degree of orientation of the melt.

A recent development in the field of blown film preparation from low-density polyethylene is the so-called long-stalk extrusion. This process, described in Plastics World of June 1982, pp. 62–64, starts from LDPE with a low melt index, which is processed at a temperature of 190° C. with a die gap of about 1.1 mm and an extra high frost line. The frost line is the place on the balloon where the polymer melt solidifies. The height of the frost line in the distance between the annular die and the frost line.

The main difference between this long-stalk extrusion and conventional extrusion lies in the degree of orientation of the melt. This results in blown film pepared by the long-stalk process having a better impact strength than conventional blown film. A drawback is that the stiffness and the tear resistance, especially in machine direction, deteriorate substantially. In addition, it is not possible to convert linear low-density polyethylene into film this way.

A method for processing linear polyethylene into blown film using die gaps of about 0.4–5 mm is described in European patent application 51358. This method uses specifically formed die gaps in order to prevent melt fracture. The temperature of the melt is between about 162° and 260° C. This method relates only to linear polyethylene.

The object of the present invention is to provide a process for the preparation of blown film from a polymer composition on the basis of polyethylene with a density of 910–940 kg/m$^3$ that is suitable for both linear and non-linear LDPE and that yields a film having good mechanical properties, notably high stiffness and good tear properties.

This object is acheived by processing the polymer composition in molten condition via an extruder through an annular die having a width of at least 2 mm, at a melt temperature at the location of the die gap of below 160° C.

Surprisingly, when processing is carried out under conditions according to the invention, special orientation effects occur, as a result of which good mechanical properties are imparted to the film, such a good tear resistance and tensile strength, high stiffness, etc. This effect increases when the temperature of the melt at the location of the die gap is below 150° C., so that processing at below 150° C. is to be preferred, and in particular at below 140° C.

The invention also relates to such oriented films.

BRIEF DESCRIPTION OF THE FIGURES

The invention is elucidated by reference to the appended figures of which

Figure 1A:
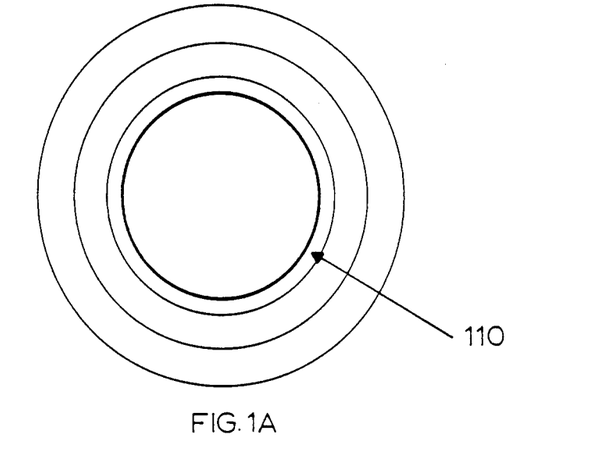
FIG. 1A is a schematic representation of X-ray scattering from a non-oriented film.
Figure 1B:
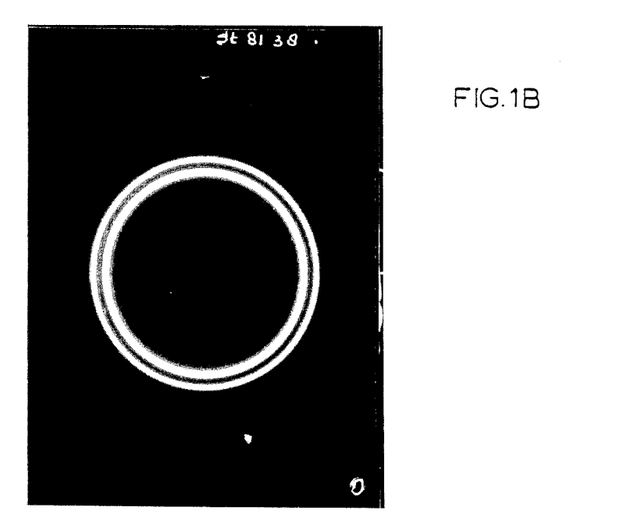
FIG. 1B is a photograph of X-ray scattering of non-oriented polyethylene.
Figure 2A:
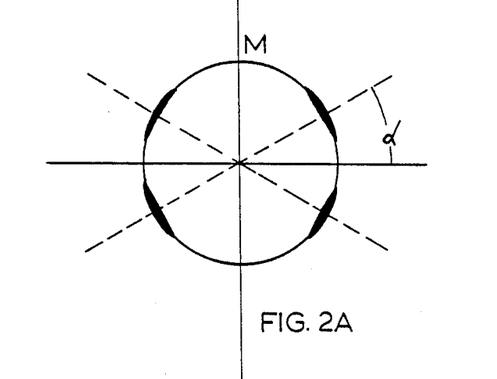
FIG. 2A is a reprersentation defining the angle "α"
Figure 2B:
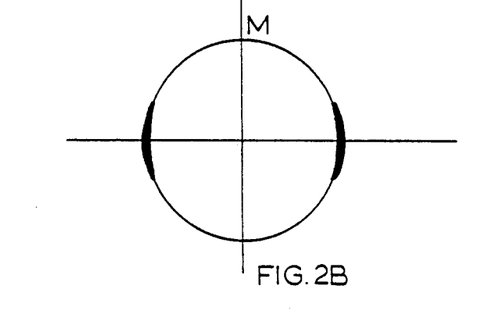
FIG. 2B is a representation of angle "a" at 0°.

The degree and direction of orientation of a film can be determined by X-ray diffraction. This method yields information on the orientation of the crystalline fraction of the film. In non-oriented film the X-rays are scattered equally in all directions, resulting in annular bands without fluctuations in intensity. This is represented schematically in FIG. 1A, while FIG. 1B is a photograph of non-oriented polyethylene. In oriented polyethylene the scattering intensity is direction dependent, so that there are fluctuations in intensity. In polyethylene, the intensity is largest at a diffraction angle of the X-ray beam (2θ) of ca. 21° (110 reflection of rhombic PE). The intensity fluctuations of this band are characteristic of the crystallite orientation and thus of the orientation of the crystallized molecules. The molecule direction is perpendicular to the associated intensity maximum. The average direction of orientation is characterized by the angle α which is the angle between the average orientation direction of the polymer molecules and the film extrusion direction (FIG. 2A). The more the average molecule direction and the direction of extrusion coincide, the nearer α will approach 0° (FIG. 2B).

The distribution of the molecule direction (degree of orientation) manifests itself in the extensiveness of the intensity maximum. So the ratio intensity maximum: intensity minimum is an index of the degree of orientation.

Figure 3:
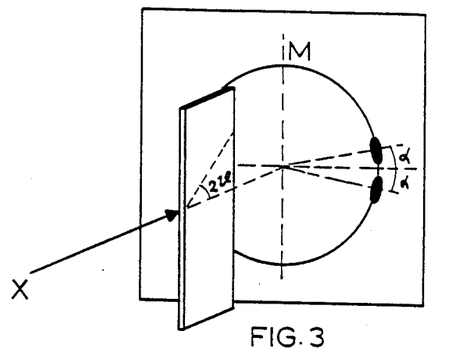
FIG. 3 is a diagram of an X-ray photograph.

FIG. 3 is a diagram of an X-ray photograph. X is the direction of the X-ray beam, $2\theta$ is the diffraction angle of the X-ray beam, M is the direction of film extrusion (machine direction), $\alpha$ is the angle between the average direction of orientation of the polymer molecules and the direction of film extrusion.

It has now been found that films that have, when subjected to X-ray diffraction analysis, an intensity ratio max./min. of the 110 reflection band of at least 20 and an angle $\alpha$ between the average orientation direction of the polymer molecules and the film extrusion direction of at most 20°, have special mechanical properties, such as good tear resistance, tensile strength, high stiffness, etc. Especially films with an intensity ratio max./min. $\geqq 30$ and an angle $\alpha \geqq 15°$, and in particular $\alpha \geqq 10°$, possess these properties to a high degree.

A degree of orientation this high has not previously been found in known films on the basis of low-density polyethylene.

Polymer compositions that are suitable for being processed into blown film in accordance with the invention generally contain at least 50 wt. % polyethyene homopolymer and/or one or more copolymers with a density of 910–940 kg/m$^3$. Low-density polyethylene homopolymer, copolymers of ethylene with one or more C$_3$–C$_{15}$ alkenes, copolymers of ethylene and one or more polar comonomers with a comonomer content of at most 10 wt. %, relative to the ethylene (e.g. vinyl acetate, methacrylate) can be applied with good results. Also mixtures are suitable, like for instance mixtures of polyethylene homo- and/or copolymers with a density of 910–940 kg/m$^3$, or mixtures of polyethylene homo- and/or copolymers having a density of 910–940 kg/m$^3$ with low-density polyethylene copolymers (with a density less than 940 kg/m$^3$), high density polyethylene (with a density in excess of 940 kg/m$^3$) and or polypropylene. In these mixtures preferably at least 70 wt. %, relative to the total polymer content, of the homo- and/or copolymer with a density of 910–940 kg/m$^3$ is present. For the preparation of films having good optical properties, the use of a polymer composition on the basis of polyethylene homopolymer or a copolymer of ethylene and one or more polar comonomers with a comonomer content of at most 10 wt. % relative to the ethylene, is to be recommended. The process according to the invention is particularly suitable for the preparation of films having good mechanical and optical properties from low-density polyethylene homopolymer or ethylene vinyl acetate copolymer.

Furthermore, various additives, such as stabilizers, slip agents, fillers, colorants, waxes and the like, may be present. The amount by weight of additives usually will not exceed 20% of the amount by weight of polymer.

The melt index of these polymer compositions, determined according to ASTM D 1238, may have the usual values, for instance between 0.3 and 30 dg/min. In view of the low processing temperature, however, it is to be recommended to choose a melt index of not lower than 2 dg/min. The favorable effect that low-temperature processing in combination with the large die gap has on the mechanical properties, decreases when the melt index exceeds 25 dg/min, and is most pronounced at a melt index of at most 20 dg/min, in particular at most 17 dg/min.

The advantage of the invention is that also polymer compositions having a relatively high melt index can be processed into blown film with good mechanical properties.

Often, packaging film must not only satisfy requirements with respect of its mechanical properties, but also requirements relating to its optical properties. The optical properties of the film improve when use is made of a polymer composition having a melt index of at least 5 dg/min, in particular at least 8 dg/min.

There already is advantage in applying the invention at die gaps of 1 mm, but larger die gaps, for instance of 5 or 10 mm, can also be applied; in addition, the geometry of the die may be varied. It has now been found that the mechanical properties of the film improve when the die gap used is at least 2 mm and at most 5 mm, in particular at least 3 mm, while the optical properties are also improved.

In combination with the low processing temperature, these larger die gaps result in even better mechanical properties, notably in good stiffness and tear properties.

In blown film extrusion, the polymer composition exits the annular die in molten condition and is subsequently blown up. The resulting balloon is cooled by contacting it with relatively cool air or water.

Balloon diameter divided by annular die diameter is called the blow-up ratio. This may vary between 1 and 6, but generally is 1.5 to 4. These values can also be applied in the process according to the invention, yielding good results.

The process according to the invention is suitable especially for the preparation of monolayer film, but can also be used for multilayer film.

The invention will now be elucidated on the basis of some examples.

EXAMPLES AND COMPARATIVE EXAMPLES 1 THROUGH 23

Blow film was prepared under conditions as shown in Tables 1–3. Use was made of a Schwabenthan extrusion equipment with a screw diameter of 30 mm and a length/diameter ratio of 24:1. The diameter of the annular die was 5 cm.

The melt temperature at the die gap was determined by infrared measurement. The film output was held constant at 50 g/min. Of the film, the following properties were determined:
  modulus of elasticity according to ASTM D 1922;
  strength and tensile strength according to ISO R 527;
  puncture resistance, determined from the energy required to puncture the film with a plunger at a rate of 50 mm/min;
  notched tear resistance according to a method derived from DIN 53363, but with the notch at the center of the film, at the drawing rate of 2.5 cm/min;
  gloss according to ASTM D 523;
  opacity according to ASTM D 1003;
  transparency according to the Electro Evans Ltd. method.

For examples 15 and 19–23, the X-ray diffraction measurement was performed using CuK$\alpha$ radiation (50 kV, 35 mA, Ni-filter) and a Statton camera. Parallel film radiation was employed (see FIG. 3). The sample-photograph distance 2 as 5 cm. Densitometry of the photograph as carried out along the diameters of the circular bands for the directions M and $\alpha$. For one densitometer scan the changes in the intensity are recorded as a function of the diffraction angle of the X-ray beam ($2\theta$, FIG. 2 4) for densitometrical purposes use was made of an Enraf Nonius microdensitometer, model 1, and the method described in C.G. Vonk & A.P. Pipers, J. Appl. Cryst., 14, 8, (1981).

Figure 4:
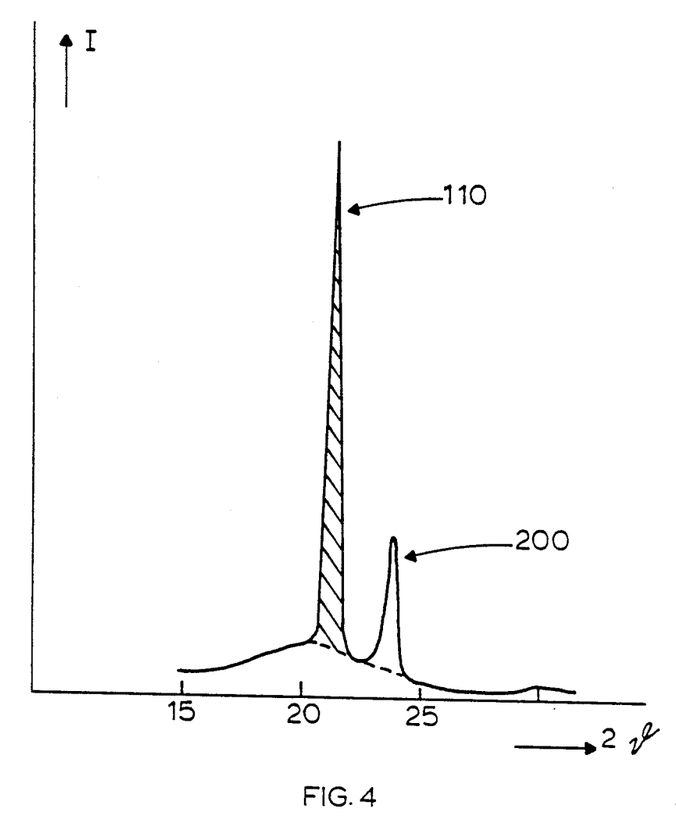
FIG. 4 is a graphic representation of changes in intensity during a densitometer scan as a function of diffraction angle.

The correction for the amorphous background radiation is carried out as indicated in FIG. 4, taking into account the characteristic shape of the scattering curve for amorphous PE.

The shaded part of FIG. 4 represents the crystalline fraction of the 110 reflection band.

TABLE 1

|  | comp. ex. 1 | comp. ex. 2 | ex. 3 | comp. ex. 4 | ex. 5 | ex. 6 | ex. 7 | ex. 8 |
|---|---|---|---|---|---|---|---|---|
| Polymer composition | LDPE | LDPE | LDPE | LDPE | LDPE | LDPE | LDPE | LDPE |
| density, kg/m$^3$ | 922 | 922 | 921 | 921 | 921 | 921 | 921 | 921 |
| melt index, dg/min | 0.3 | 0.3 | 2 | 9 | 9 | 14.5 | 14.5 | 14.5 |
| temperature, °C. | 182 | 137 | 159 | 170 | 140 | 156 | 139 | 141 |
| die gap, μm | 2000 | 2000 | 3000 | 2000 | 2000 | 2000 | 2000 | 3000 |
| frost line, cm | 15 | 15 | 16 | 8 | 8 | 10 | 8 | 14 |
| blow-up ratio | 3 | 3 | 2 | 2 | 2 | 2 | 2 | 2 |
| film thickness, μm | 30 | 30 | 22 | 25 | 25 | 25 | 25 | 25 |
| output, g/min | 50 | 50 | 50 | 50 | 50 | 50 | 50 | 50 |
| modulus of elasticity, (parallel) N/mm$^2$ (perpendicular) | 182 / 239 | 222 / 255 | 220 / 217 | 127 / 136 | 174 / 199 | 133 / 153 | 143 / 176 | 135 / 210 |
| yield strength, N/mm$^2$ (parallel) (perpendicular) | 10 / 11.5 | 13.5 / 11 | 12 / 9 | 9.5 / 8.5 | 11 / 10 | 9 / 9 | 9.5 / 10 | n.m.[1] / n.m.[1] |
| puncture resistance, J/m | 816 | 895 | n.m.[1] | 459 | 424 | n.m.[1] | 468 | n.m.[1] |
| notched tear resistance, (parallel) kJ/m$^2$ (perpendicular) | 294 / 184 | 322 / 1210[2] | 393 / 926[2] | 277 / 171 | 287 / 356[2] | 251 / 154 | 285 / 218[2] | 305 / 449[2] |
| tensile strength, N/mm$^2$ | 29 / 29 | 35 / 24 | 36 / 11 | 19 / 11 | 28 / 15 | 16.5 / 10.5 | 20 / 13 | n.m.[1] / n.m.[1] |
| gloss, in tenths of a percent | 40 | 32 | 50 | 85 | 88 | 80 | 89 | 82 |
| opacity, % | 9 | 15 | 9 | 7 | 4 | 8 | 4 | 12 |
| transparency | 18 | 49 | 18 | 4.1 | 5.8 | 3 | 5.3 | 4.4 |

Notes:
[1] not measured
[2] the notch did not tear further, so that drawing phenomena occurred.
[3] owing to the high opacity, the value for transparency cannot be determined in a reliable way.
[4] α can only be determined in a reliable way if the intensity ratio max/min is ≧ 10.
[5] intensity ratios max/min > 100 are represented by ∞, due to the small value of minimum intensity.

TABLE 2

|  | comp. ex. 9 | ex. 10 | comp. ex. 11 LDPE + 10 % C8-LL | ex. 12 LDPE + 10 % C8-LL | comp. ex. 13 | ex. 14 | comp. ex. 15 |
|---|---|---|---|---|---|---|---|
| Polymer composition | EVA-2.5% | EVA-2.5% |  |  | LDPE | LDPE | film taken from the market, same polymer composition as in ex. 13 and 14 |
| density, kg/m$^3$ | 925 | 925 | 922 | 922 | 921 | 921 | |
| melt index, dg/min | 2 | 2 | 2.5 | 2.5 | 4.5 | 4.5 | |
| temperature, °C. | 154 | 112 | 168 | 122 | 159 | 107 | |
| die gap, μm | 600 | 600 | 600 | 600 | 600 | 2000 | |
| frost line height, cm | 15 | 15 | 15 | 15 | 15 | 15 | — |
| blow-up ratio | 2 | 2 | 2 | 2 | 2 | 2 | — |
| film thickness, μm | 25 | 30 | 18 | 17 | 20 | 20 | 30 |
| modulus of elasticity, (parallel) N/mm$^2$ (perpendicular) | 156 / 149 | 190 / 213 | 227 / 271 | 221 / 229 | 171 / 204 | 281 / 284 | 176 / 171 |
| yield strength, N/mm$^2$ | 9.5 / 9 | 13 / 10 | 12.5 / 11.5 | 20 / 18 | 10 / 10.5 | 15 / 12 | n.m.[1] / n.m.[1] |
| puncture resistance, J/m | n.m.[1] | n.m.[1] | 535 | n.m.[1] | 361 | 403 | n.m.[1] |
| notched tear resistance, kJ/m$^2$ | 351 / 275 | 332 / 647[2] | 290 / 244 | 321 / 473[2] | 227 / 316[2] | 243 / 108 | n.m.[1] / n.m.[1] |
| tensile strength, N/mm$^2$ | 26 / 21 | 32 / 17 | 35 / 22 | 55 / 27 | 22 / 14.5 | 43 / 14.5 | n.m.[1] / n.m.[1] |
| gloss, in tenths of a percent | 55 | 38 | 21 | 30 | 52 | 25 | n.m.[1] |
| opacity, % | 7 | 13 | 13 | 16 | 7 | 23 | n.m.[1] |
| transparency, EEL | 22 | 34 | 41 | n.r.d.[3] | 20 | n.r.d.[3] | n.m.[1] |
| I max/min | n.m.[1] | n.m.[1] | n.m.[1] | n.m.[1] | n.m.[1] | n.m.[1] | 9 |
| α, degrees | n.m.[1] | n.m.[1] | n.m.[1] | n.m.[1] | n.m.[1] | n.m.[1] | 25[4] |

For footnotes, see Table 1.

TABLE 3

Figure 5:
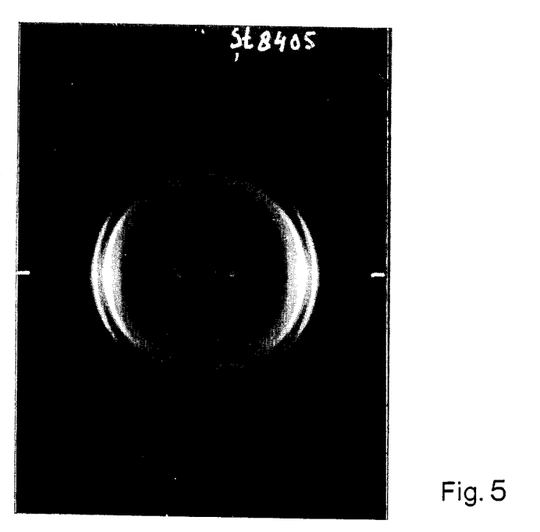
FIGS. 5, 6 and 7 are photographs of X-ray scattering of the film of Examples 21, 22 and 23 respectively.
Figure 6:
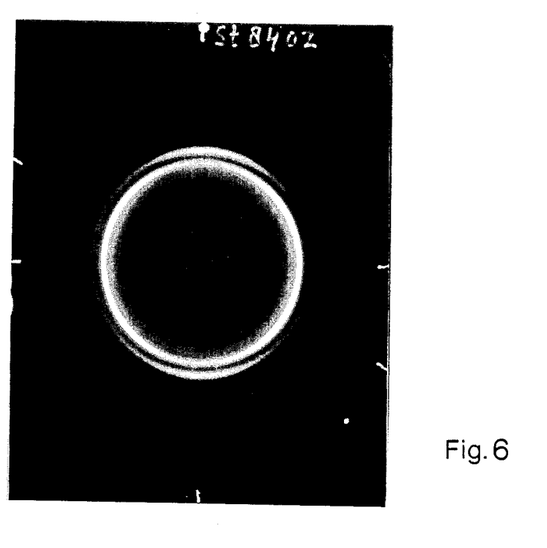
Figure 7:
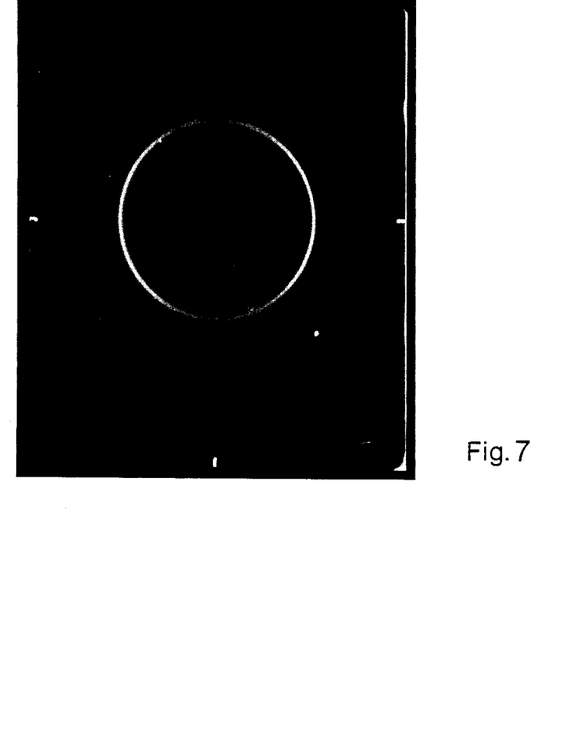

|  | comp. ex. 16 | ex. 17 | ex. 11 | ex. 19 | comp. ex. 20 | FIG. 5 ex. 21 | FIG. 6 comp. ex. 22 | FIG. 7 comp. ex. 23 |
|---|---|---|---|---|---|---|---|---|
| Polymer composition | LDPE | LDPE | LDPE | LDPE | LDPE | LDPE | LDPE | film taken from the market, same polymer composition as in ex. 14 and 15 |
| density, kg/m$^3$ | 921 | 921 | 921 | 921 | 921 | 926.5 | 926.5 | |
| melt index, dg/min | 9 | 9 | 14 | 7 | 7 | 2 | 2 | |
| temperature, °C. | 170 | 120 | 113 | 120 | 162 | 130 | 170 | |
| die gap, μm | 2000 | 2000 | 2000 | 3000 | 1000 | 4000 | 600 | |
| frost line height, cm | 8 | 8 | 8 | 11 | 10 | 10 | 26 | — |
| blow-up ratio | 2 | 2 | 2 | 2 | 2 | 2 | 2 | — |
| film thickness, μm | 25 | 25 | 25 | 25 | 25 | 30 | 30 | 25 |

TABLE 3-continued

| | comp. ex. 16 | ex. 17 | ex. 11 | ex. 19 | comp. ex. 20 | FIG. 5 ex. 21 | FIG. 6 comp. ex. 22 | FIG. 7 comp. ex. 23 |
|---|---|---|---|---|---|---|---|---|
| modulus of elasticity, (parallel) N/mm² (perpendicular) | 127 136 | 198 212 | 192 239 | 221 250 | 143 182 | 294 304 | 173 179 | 209 242 |
| yield strength, N/mm², (parallel) (perpendicular) | 9.5 8.5 | 11 9 | 9.5 9.5 | n.m.[1] n.m.[1] | n.m.[1] n.m.[1] | 23 16 | 12.5 11.5 | n.m.[1] n.m.[1] |
| puncture resistance, J/m | 459 | 484 | n.m.[1] | n.m.[1] | n.m.[1] | 299 | n.m.[1] | n.m.[1] |
| notched tear resistance, (parallel) kJ/m² (perpendicular) | 277 171 | 364 765[2] | 243 351[2] | 351 342[2] | 303 234[2] | 368 185[2] | 261 224 | n.m.[1] n.m.[1] |
| tensile strength, N/mm², (parallel) (perpendicular) | 19 11 | 30.5 10 | 23.5 10.5 | n.m.[1] n.m.[1] | n.m.[1] n.m.[1] | n.m.[1] n.m.[1] | n.m.[1] n.m.[1] | n.m.[1] n.m.[1] |
| gloss, o/oo | 85 | 73 | 80 | 58 | 70 | 26 | 59 | n.m.[1] |
| opacity, % | 7 | 4.5 | 5 | 16 | 14 | 22 | 9 | n.m.[1] |
| transparency, EEL | 4.1 | 6.2 | 4 | n.r.d.[3] | 9 | n.r.d.[3] | 7 | n.m.[1] |
| $I \frac{max.}{min.}$ | n.m.[1] | n.m.[1] | n.m.[1] | $\infty^5$ | $\infty^5$ | $\infty^5$ | 6 | 4 |
| α, degrees | n.m.[1] | n.m.[1] | n.m.[1] | 19 | 27 | 0 | 28[4] | 0[4] |

For footnotes, see Table 1.

I claim:

1. Process for the preparation highly oriented blown film from polymer composition, said process comprising:
    melting (1) a polyethylene homopolymer having a density 910–940 kg/m³, or
    (2) a copolymer of ethylene with up to 10% by weight of a polar comonomer, or
    (3) mixtures of (1) and (2), or
    (4) mixtures of (1) and (2) with up to 50% by weight of polyethylene with a density less than 940 kg/m³, copolymers of ethylene with $C_3$ to $C_{15}$ alkene monomer, or propylene;
    (5) mixtures of at least 70% by weight polyethylene homo- and/or copolymers having a density of 910–940 kg/m³ with low density polyethylene copolymers (density less than 940 kg/m³), high density of polyethylene (with a density in excess of 940 kg/m³) and/or polypropylene;
    the polymer having a melt index of from 7–25 dg/min;
    extruding said molten polymer through an annular die and forming a balloon film product of said polymer by force of a gas applied to an opening in said die, said annular die having a die gap of at least 2 mm, and the molten polymer having a temperature below 160° C. at said die gap; and
    cooling, flattening and rolling up said balloon;
    wherein said film product exhibits an X-ray diffraction analysis of the 110 reflection band having (a) a maximum to minimum intensity ratio of at least 20, and (b) angle α of at most 20° between the average orientation direction of the polymer molecules and the film extrusion direction.

2. Process as claimed in claim 1, wherein said molten polymer is extruded at a die gap temperature of below 125° C.

3. Process as claimed in claim 1, wherein said film product is a monolayer film.

4. Process as claimed in claim 1, wherein said polyethylene polymer is a homopolymer.

5. Process as claimed in claim 2, wherein said polyethylene polymer is a copolymer of ethylene and one or more polar comonomers, with a comonomer content of at most 10% relative to said ethylene.

6. Process according to claim 5, wherein said copolymer is ethylene vinyl acetate.

* * * * *

UNITED STATES PATENT AND TRADEMARK OFFICE
CERTIFICATE OF CORRECTION

PATENT NO. : 4,832,897
DATED : May 23, 1989
INVENTOR(S) : VAN DER MOLEN

It is certified that error appears in the above—identified patent and that said Letters Patent is hereby corrected as shown below:

IN THE ABSTRACT:

Change "retleation" to --reflection--.

Column 1, line 59, change "pepared" to --prepared--.

Column 2, line 35, change "a" to --$\alpha$--.

Column 3, line 15, change "$\alpha \geq 15°$" to --$\alpha \leq 15°$-- and change "$\alpha \geq 10°$" to --$\alpha \leq 10°$--.

Column 4, line 35, change "Blow" to --Blown--.

Signed and Sealed this

Fifth Day of October, 1993

Attest:

BRUCE LEHMAN

Attesting Officer       Commissioner of Patents and Trademarks